United States Patent [19]

Wagner

[11] Patent Number: 5,086,664
[45] Date of Patent: Feb. 11, 1992

[54] ENERGY STORAGE FLYWHEELS USING FLUID TRANSFER TO VARY MOMENTS OF INERTIA

[76] Inventor: John T. Wagner, 510 Wide Ave., Drexel Hill, Pa. 19026

[21] Appl. No.: 425,660

[22] Filed: Oct. 23, 1989

Related U.S. Application Data

[63] Continuation-in-part of Ser. No. 857,839, Apr. 30, 1986, abandoned.

[51] Int. Cl.⁵ .................. F16F 15/30; F16F 15/10
[52] U.S. Cl. .................. 74/572; 74/573 F; 74/574; 475/111
[58] Field of Search ........... 74/573 F, 574, 572; 475/84, 85, 111

[56] References Cited

U.S. PATENT DOCUMENTS

| | | | |
|---|---|---|---|
| 1,165,410 | 12/1915 | Hitchcock | 74/196 |
| 1,759,466 | 5/1930 | Porter | 74/64 |
| 1,867,590 | 7/1932 | Porter | 74/64 |
| 1,878,727 | 9/1932 | Sturbelle | 74/64 |
| 2,196,654 | 4/1940 | Bertran | 74/94 |
| 2,545,152 | 3/1951 | Haidegger | 74/194 |
| 3,208,303 | 9/1965 | Durouchoux | 74/572 |
| 3,233,390 | 6/1966 | Cancrinus et al. | 475/111 |
| 3,251,248 | 5/1966 | Cancrinus | 475/111 |
| 3,261,233 | 7/1966 | Cancrinus | 475/111 |
| 3,276,291 | 10/1966 | Cancrinus et al. | 475/111 |
| 3,302,489 | 2/1967 | Cancrinus et al. | 475/111 |
| 3,334,528 | 8/1967 | Cancrinus | 74/752 |
| 3,334,529 | 8/1967 | Cancrinus et al. | 475/111 |
| 3,360,924 | 1/1968 | Davis | 74/574 |
| 3,364,794 | 1/1968 | Ishioka | 74/751 |
| 3,425,297 | 2/1969 | Friedmann et al. | 475/111 |
| 3,425,298 | 2/1969 | Friedmann et al. | 475/111 |
| 3,449,983 | 6/1969 | Friedmann et al. | 475/111 |
| 3,675,506 | 7/1972 | Leone | 74/572 |
| 3,802,295 | 4/1974 | Lemmens | 74/796 |
| 3,850,050 | 11/1974 | Lemmens | 74/689 |
| 3,851,545 | 12/1974 | Gumlich | 74/751 |
| 3,863,510 | 2/1975 | Benson | 74/64 |
| 3,875,814 | 4/1975 | Steuer | 74/94 |
| 3,955,428 | 5/1976 | Ward | 74/64 |
| 4,069,669 | 1/1978 | Pitkanen | 74/572 X |
| 4,088,041 | 5/1978 | Kraus | 74/572 |
| 4,169,391 | 10/1979 | Schonberger | 74/5 R |
| 4,335,627 | 6/1982 | Maxwell | 74/572 |
| 4,386,536 | 6/1983 | Kraus | 74/200 |
| 4,473,753 | 9/1984 | Izumi et al. | 290/45 |
| 4,474,076 | 10/1984 | Lehmann | 74/573 R |
| 4,495,451 | 1/1985 | Barnard | 180/165 |
| 4,532,769 | 8/1985 | Vestermark | 60/698 |
| 4,597,463 | 7/1986 | Barnard | 318/150 |
| 4,928,553 | 5/1990 | Wagner | 475/268 |
| 5,007,303 | 4/1991 | Okuzumi | 74/572 X |

FOREIGN PATENT DOCUMENTS

| | | | |
|---|---|---|---|
| 651 | 1/1983 | Japan | 74/572 |
| 1221405 | 3/1986 | U.S.S.R. | 74/572 |

OTHER PUBLICATIONS

Weissler, Paul, "The CVT Gearless Transmission: Performance, Economy and No Shifting", *Mechanics Illustrated*, Mar. 1983, pp. 68–70, 72, 76 and 122.

*Primary Examiner*—Richard Lorence
*Assistant Examiner*—Khoi Q. Ta
*Attorney, Agent, or Firm*—Panitch Schwarze Jacobs & Nadel

[57] ABSTRACT

The invention includes liquid weighted, variable inertia flywheels of various designs together with subsystems to selectively control the addition of liquid into and the removal of liquid from the flywheels while the flywheels rotate. In one embodiment liquid is removed and energy extracted through centrally mounted turbines. In other embodiments, liquid is extracted through various rotatable Pitot tube devices. In yet another embodiment liquid is added and removed through bucket wheels supported for rotation on a centrally located, independently rotatable carrier. Pairs of flywheels are further incorporated into continuously variable transmissions, together with fluid control devices to vary the fluid levels in and thus the moment of inertia of each of the flywheels for energy storage and extraction.

17 Claims, 10 Drawing Sheets

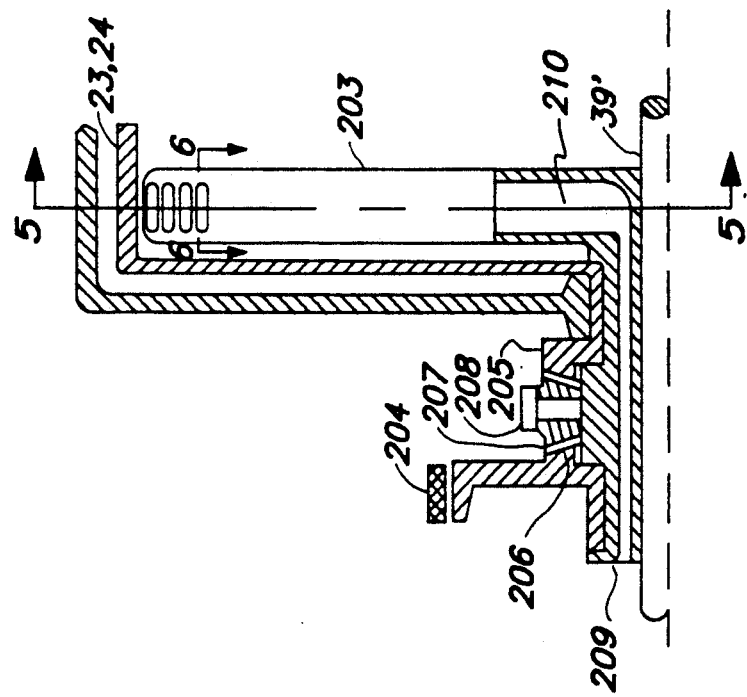
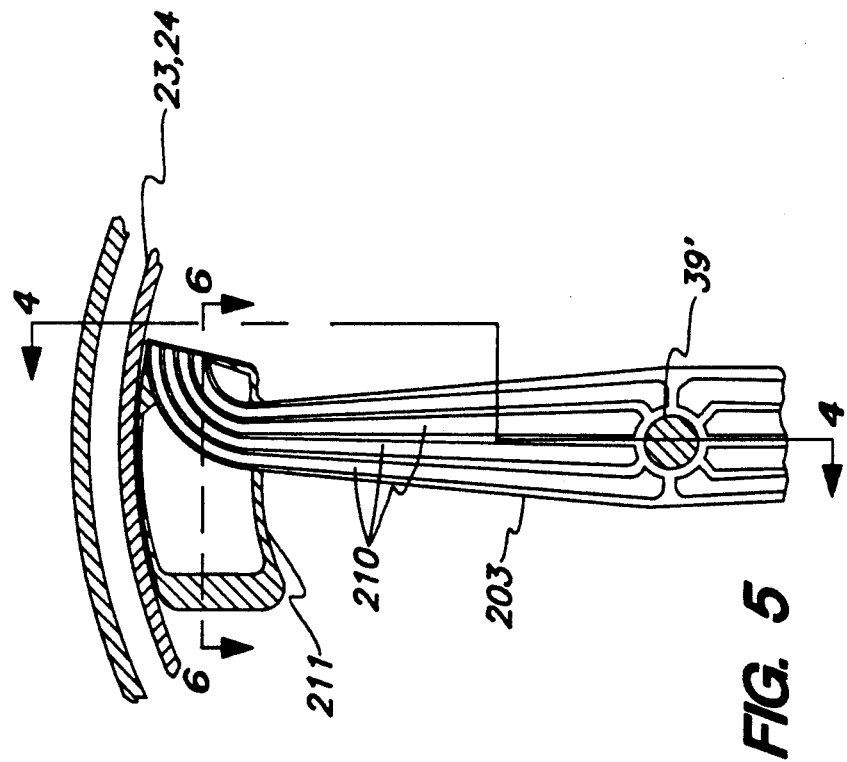

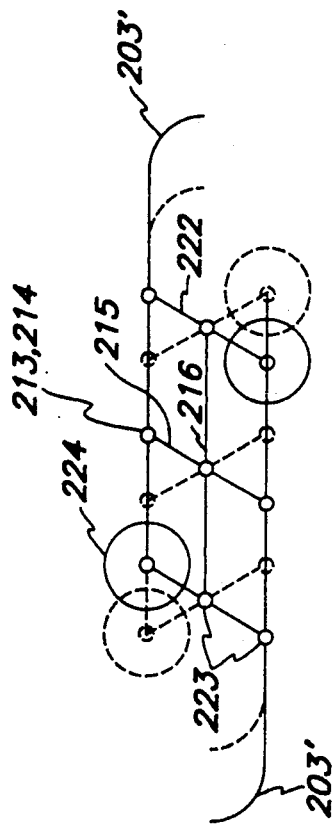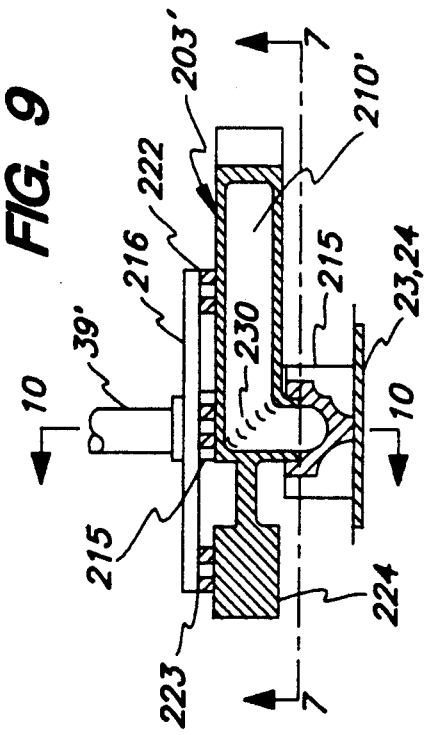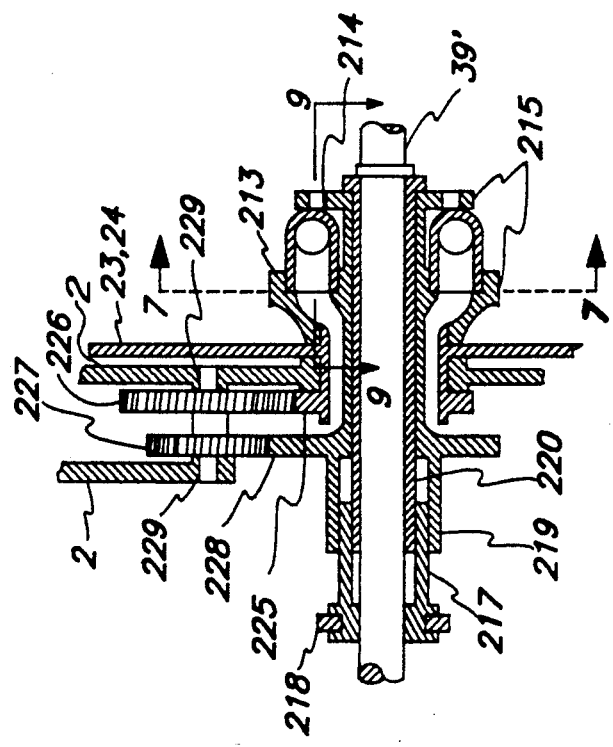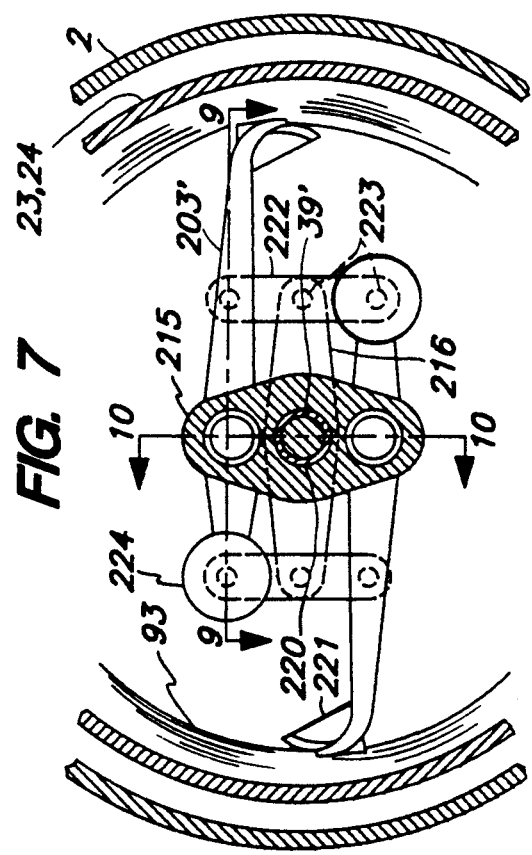

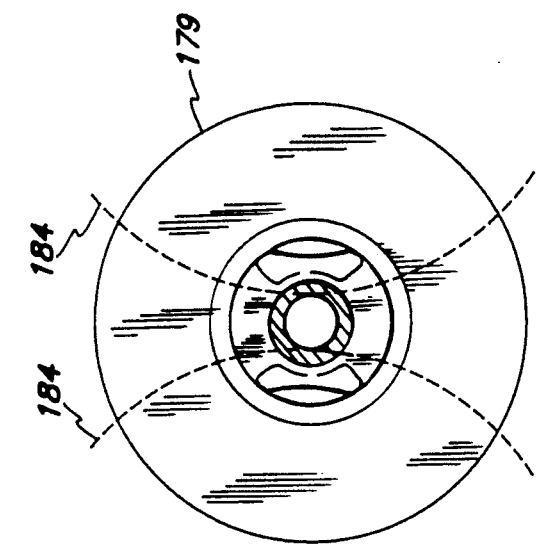
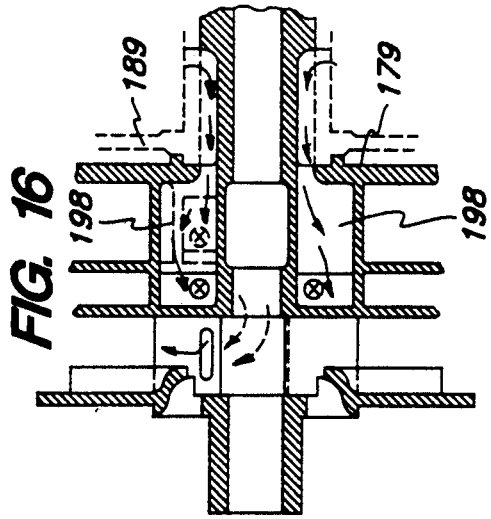
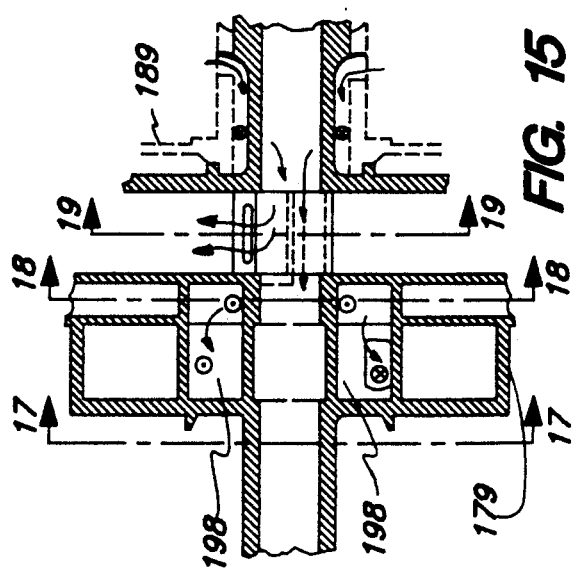
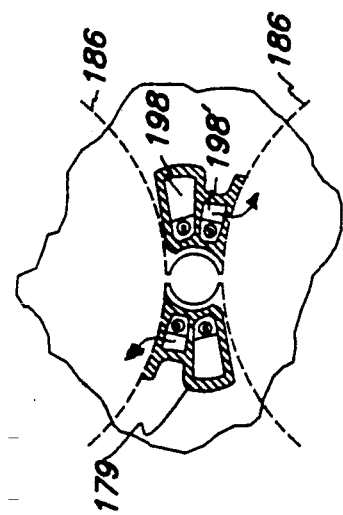
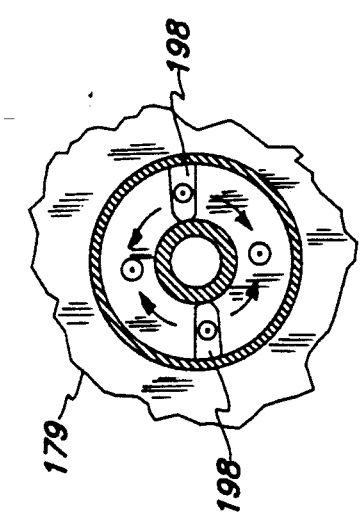

ENERGY STORAGE FLYWHEELS USING FLUID TRANSFER TO VARY MOMENTS OF INERTIA

This application is a continuation-in-part of U.S. application Ser. No. 06/857,839 filed Apr. 30, 1986 now U.S. Pat. No. 4,928,553.

FIELD OF THE INVENTION

The invention relates to mechanical energy storage systems and, in particular, to the incorporation of such systems into continuously-variable transmissions.

BACKGROUND OF THE INVENTION

My prior invention, disclosed in the above-identified patent application, is a continuously-variable transmission with variable inertia flywheels for energy storage. A main pair of the variable inertia flywheels was provided for primary energy storage and used radially displaceable solid masses for varying moment of inertia. A secondary pair of control flywheels was provided for controlling changes in the moments of inertia of a primary pair of flywheels. The secondary control flywheels also provided some supplemental energy storage. Liquid could be added to and removed from the secondary control flywheels to vary their moments of inertia for control purposes. The primary flywheels were selectively coupled through gearing to an input shaft and/or an output shaft to provide energy storage with the continuously-variable transmission.

The mechanically positionable solid masses of the primary flywheels and the associated gearing of the transmission of my prior invention provided high operating efficiency. However, the major drawback of that device was its complexity and the possibility of damage to moving components, primarily the radially displaceable solid members used to vary moment of inertia of the primary flywheels.

The present invention is directed to energy storage systems, and particularly to continuously-variable transmissions incorporating such systems, where moment of inertia variations of the flywheels are accomplished hydraulically.

Energy storage systems utilizing liquid for moment of inertia variation and continuously-variable transmissions incorporating such systems can have certain possible advantages and disadvantages when compared with my prior invention using solid weight members.

A first possible advantage is that movement of liquid in such flywheels is much more easily controlled. Additional flywheels, such as the secondary control flywheels in my prior invention, or alternative devices, such as mechanically geared or continuously-variable transmissions, are not required for control of the primary flywheels.

A second possible advantage is that when such flywheels are used in an energy storage transmission, the transmission can be not only continuously-variable, but infinitely variable in the lowest speed range, permitting drive in either the forward or reverse direction without shifting. This would be a useful feature in vehicles such as tractors, bulldozers, backhoes, locomotives, etc. Inertia variations in such flywheels are not fixed and symmetry does not have to be maintained as was the case with the solid mass flywheels of my prior invention. Energy can then be extracted or stored when the output torque is split equally between the forward-driving and reverse-driving flywheels. However, the portion of the stored energy that can be used with this gearing is rather small.

A third possible advantage is that the simpler of my liquid filled flywheels designs should permit a high ratio of maximum to minimum moments of inertia and a substantial range of speed, despite the second possible disadvantage listed below.

A fourth possible advantage is that the liquid used as a movable mass is not subject to damage, unlike flexible strip used in my prior invention.

A fifth possible advantage is that flywheel housing stresses do not increase as rapidly with speed as they do with solid masses because the quantity of liquid and its contribution to these stresses are both generally reduced as speed increases.

A sixth possible advantage in some liquid mass flywheel designs is that space can be saved by locating many of the gears and clutches in the centers of such flywheels.

A seventh possible advantage is that output energy can be extracted directly from both flywheels with some designs, although efficiency is liable to be reduced.

An eighth possible advantage is that the speed of one or both flywheels can be limited by continuing to admit liquid after the flywheel is filled. This permits extension of the lowest speed range. Energy can be extracted from the overflow by directing it into a turbine or equivalent device.

A ninth possible advantage is that braking energy can be absorbed in any speed range, even after the energy storage capacity is reached, by allowing the excess liquid to overflow.

Energy storage system employing liquid filled variable inertia flywheels may suffer from certain disadvantages.

A first disadvantage is that hydraulic devices are required to extract energy from the flywheels and these are generally less efficient that mechanical devices.

A second possible disadvantage is that the speed range and/or the energy available for output are reduced when simple devices are used to extract energy. This is because no energy is exchanged between flywheels through the control systems. All of the energy required to move a flywheel mass inward is supplied from the same flywheel, reducing the amount of energy available from that flywheel for output. The only purpose then served by a second flywheel is that it permits starting from a stop or braking to a complete stop.

A third possible disadvantage is that some hydraulic designs are also mechanically complicated and they require bearings subjected to heavy loads from centrifugal forces.

A fourth possible disadvantage is that the entire centrifugal load produced by the liquid is carried solely by the flywheel housings whereas the mechanical weights in the prior invention were capable of supporting a major portion of the centrifugal load. Flywheel housing stresses may be a more severe limitation on speed and energy storage than with the prior invention despite the relatively lower density of the liquid compared to the solid weights.

A fifth possible disadvantage is that the lower density of most liquids, compared to the solid flywheel masses of the prior invention, and the speed limitations imposed by the hydraulic flywheels, may result in a bulkier apparatus than systems employing solid movable masses, despite the ability to locate portions of the gearing within the flywheels themselves in the hydraulic systems.

SUMMARY OF THE INVENTION

In one aspect the invention is a variable inertia flywheel comprising: a liquid retaining rotor drum mounted for rotation about an axis; and liquid control means for controllably varying an amount of liquid in the rotor drum during rotation of the rotor drum whereby the moment of inertia of the flywheel is selectively and controllably variable regardless of rotational speed of the rotor drum.

In another aspect, the invention is an energy storage apparatus comprising a pair of variable inertia flywheels, each flywheel including a liquid retaining rotor drum, the rotor drums being mounted for side-by-side rotation; control means for controllably and separately varying amounts of liquid in each rotor drum during rotation of the rotor drums whereby the moment of inertia of each of the pair of flywheels is selectively varied while the rotor drum of each flywheel rotates; an output shaft; and output means for selectively coupling the output shaft with either one of the two flywheels.

In another aspect, the invention comprises an apparatus as set forth above in combination with an input shaft and input means for selectively coupling the input shaft with either of the two flywheels, thereby providing an energy storage transmission.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements or instrumentalities shown. In the drawings:

FIG. 4 is a broken, cross-sectional view taken along the lines 4—4 of FIG. 5 depicting an alternate, Pitot tube design of drain means for incorporation into the flywheel of FIGS. 2 and 3 and showing its gearing to the flywheel;

FIG. 5 is a cross-section taken along the lines 5—5 in FIGS. 4 and 6 through the Pitot tube device disclosing its passages for liquid;

FIG. 6 is a cross-section taken along the lines 6—6 of FIGS. 4 and 5 through the Pitot tube device showing the streamlined fairing;

FIG. 7 is a transverse cross-section taken along the lines 7—7 of FIGS. 9 and 7-7 of FIG. 10 through a second type of Pitot tube reaction device with an operating linkage;

FIG. 8 is a schematic diagram showing extreme radial positions of the second type of Pitot tube reaction device and operating linkage of FIG. 7;

FIG. 9 is a partial cross-section taken along the lines 9—9 of FIGS. 7 and 9—9 of FIG. 10;

FIG. 10 is a longitudinal cross-section taken along the lines 10—10 of FIGS. 7 and 9 through the Pitot tube discharge duct and associated components;

FIGS. 15 and 16 are longitudinal sections along the lines 15—15 and 16—16, respectively, in FIG. 14 showing the flow of liquid admitted to the bucket wheels.

FIGS. 17, 18 and 19 are transverse cross-sections along lines 17—17, 18—18 and 19—19 respectively, in FIG. 15 also showing the flow of liquid admitted to the bucket wheels.

DETAILED DESCRIPTION OF THE PREFERRED EMBODIMENTS

Figure 1:
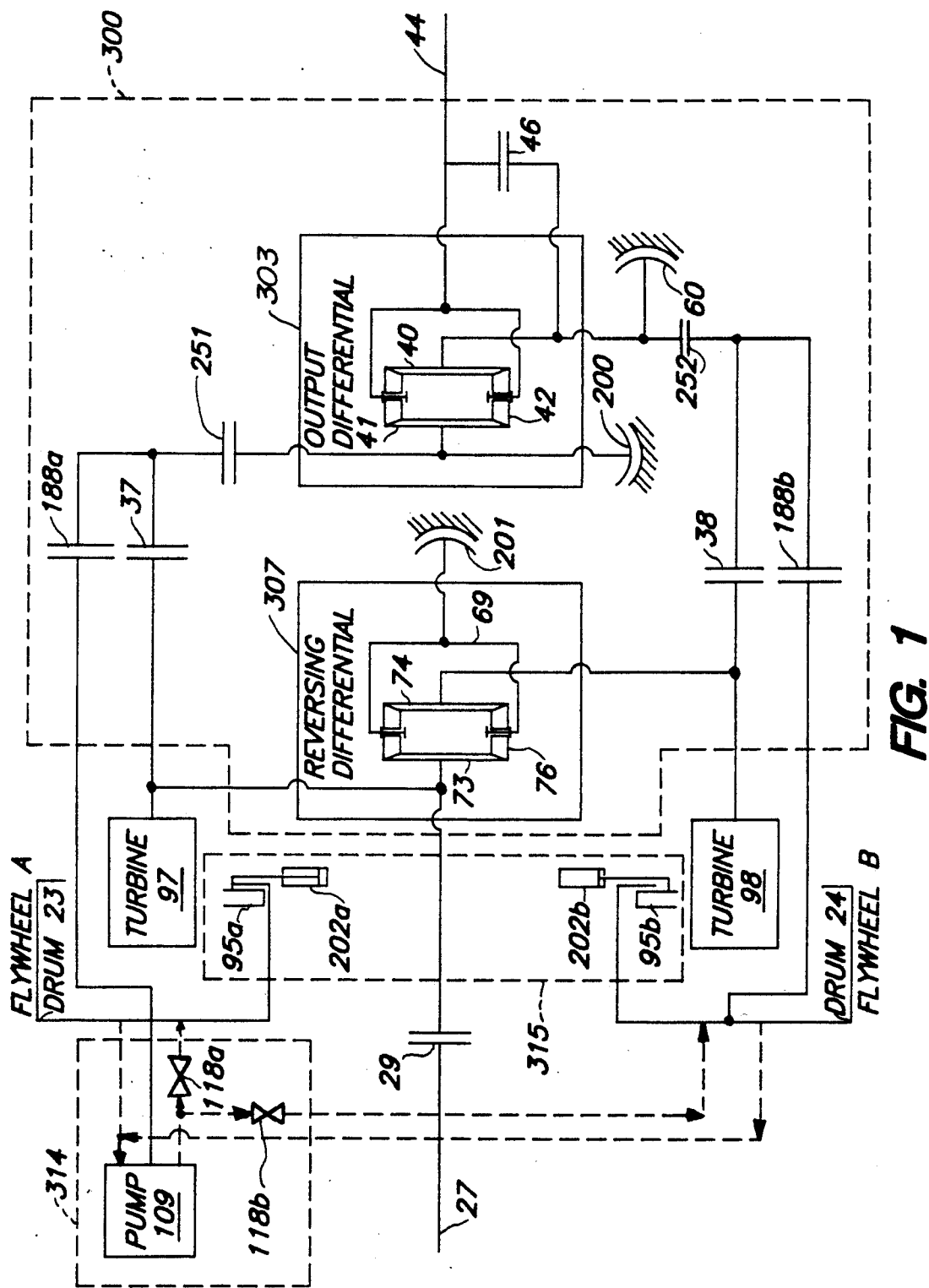
FIG. 1 is a block diagram of a first embodiment, continuously-variable, energy storage transmission incorporating a pair of liquid weighted variable inertia flywheels.

In the figures, the same numbers are used to identify same elements in each of the figures. To the degree possible, the reference numerals used parallel those in my prior U.S. application Ser. No. 06/857,839 filed Apr. 30, 1986, now U.S. Pat. No. 4,928,553 incorporated by reference in its entirety herein. Primes are used with the reference numbers to distinguish elements performing the same function but having different configurations in the various figures. Joints which are required for assembly, along with any associated keys, splines, screws, bolts or other fasteners are omitted from the figures for clarity. Simple clutches and, in most cases, plain bearings are shown for the same reason. Ball or roller bearings could obviously be used where advantageous. Positive engagement clutches could be substituted for friction clutches in most locations if appropriate means are used to avoid clashing when shifting.

Figure 2:
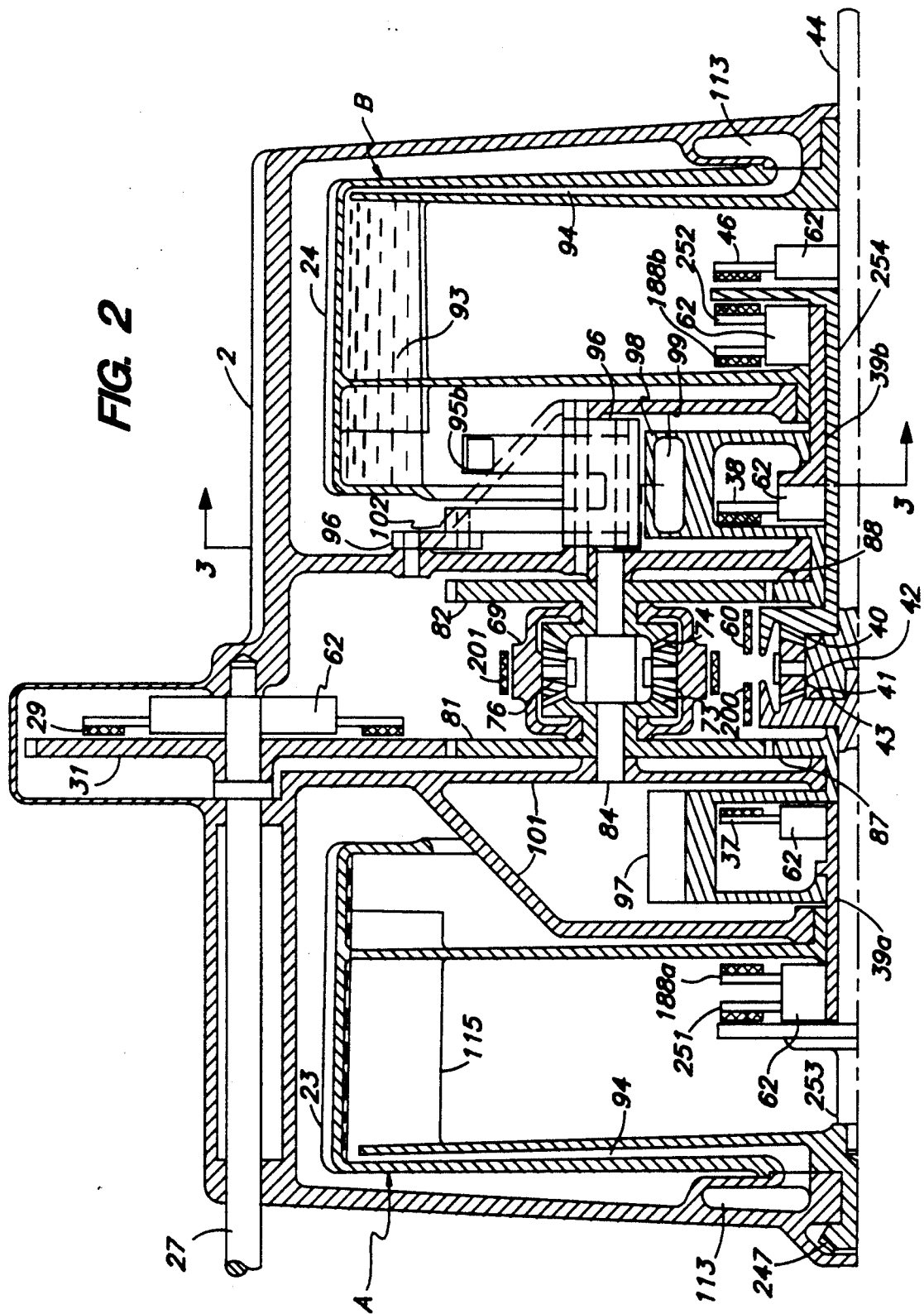
FIG. 2 is a broken, longitudinal half-section of the transmission of FIG. 1 taken along the lines 2—2 in FIG. 3.
Figure 3:
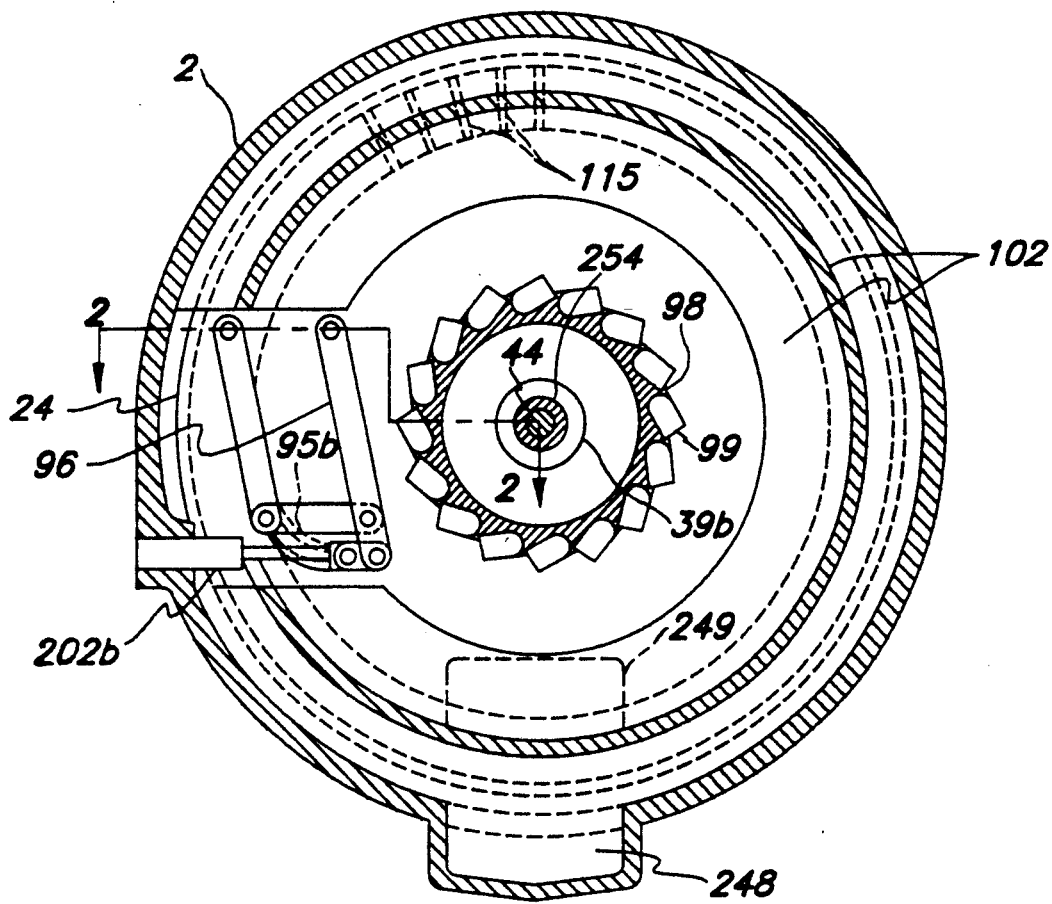
FIG. 3 is a transverse cross-section taken along the lines 3—3 in FIG. 2.

FIGS. 1 through 3 show an embodiment in which energy stored in liquid-weighted flywheels A and B, mounted for side-by-side rotation about a common central axis is extracted by impulse turbines 97 and 98, as with the control flywheels of the original patent application. This design has all of the advantages and most of the disadvantages associated with liquid weighted flywheels.

This embodiment is designed to drive and brake an output shaft 44 equally well in either rotational direction. The direction can be reversed in the lowest speed range solely by adjusting the feed and drain means, whether driving or braking is required.

The proportion of the stored energy that can be utilized with this mode of operation is rather low. Performance in the higher speed ranges is not affected. If a higher proportion is desired in the lowest speed range, output gearing similar to that in the embodiment of FIGS. 12 through 14 can be used. Turbines 97 and 98 of FIGS. 1-3 would replace carriers 179 and 180 in the embodiment in FIGS. 12 through 14. The averaging differential 306 would be eliminated and replaced by a shaft directly connecting the turbines. Less space would be required than in the embodiment of FIGS. 12 through 14 because some of the gearing can be located within the flywheels A, B of the embodiment of FIGS. 1 through 3.

Flywheels A and B rotate in opposite direction in the embodiment of FIGS. 1 through 3 while flywheels A' and B' rotate in the same direction in the embodiment of FIGS. 12 through 22. An incidental benefit of counter-rotation is that gyroscopic torques partially cancel. Violent vehicle motions could possible develop gyroscopic torques sufficient to affect maneuverability. The disadvantage is that gearing losses may be slightly higher in some cases when one output direction predominates.

FIG. 1 is a block diagram showing the more important elements in the mechanical and hydraulic circuits of the first embodiment transmission. Some elements that are not necessary for understanding the operation are omitted from various figures for clarity.

The components of the transmission disclosed in FIGS. 1 through 3 are as follows:
2 housing;
A, B variable inertia flywheels;
23, 24 liquid retaining rotor drums;
27 input shaft;
29 input clutch;
31 gear connecting input clutch 29 to reversing differential gear 82;
37, 38 clutches for connecting turbines 97 and 98 to intermediate shafts 39a and 39b, respectively;
39a, 39b intermediate shafts associated with flywheels A and B, respectively;
40, 41 (bevel) gears in output differential 303 driven by flywheels B and A, respectively;
42 pinion gears in output differential 303;
43 pinion carrier in output differential 303, attached to output shaft 44;
44 output shaft;
46 clutch connecting shafts 44 and 254;
60 brake band for stopping gear 40 in output differential 303;
62 operating mechanism associated with each clutch;
69 carrier for pinions 76 in reversing differential 307;
73, 74 bevel gears in reversing differential 307 geared to flywheels A and B, respectively;
76 pinions in reversing differential 307;
81, 82 spur or helical gears of reversing differential 307 meshing with turbine gears 87 and 88, respectively;
84 support shaft for reversing differential 307;
87, 88 gears attached to turbines 97 and 98, respectively;
93 liquid for weighting flywheels A and B;
94 channels in rotor drums 23 and 24 for admitting liquid;
95a, 95b scoops for removing liquid from rotor drums 23 and 24, respectively;
96 links for guiding and supporting scoops 95a and 95b;
97, 98 hydraulic impulse turbines in flywheels A and B, respectively;
99 turbine buckets;
101, 102 inner walls of housing 2 supporting bearings for flywheels A and B and containing discharge of turbines 97 and 98, respectively;
109 pump;
113 liquid inlet chambers for flywheels A and B;
115 paddles in flywheel drums 23 and 24, to keep liquid 93 rotating with the drums;
118a, 118b servovalves controlling flow of liquid into flywheels A and B;
188a, 188b clutches connecting drums 23 and 24 to intermediate shafts 39a and 39b, respectively;
200 brake band for stopping gear 41 in output differential 303;
201 brake band for stopping carrier 69 in reversing differential 307;
202a, 202b actuators controlling positions of scoops 95a, 95b;
247 pump drive gear;
248 sump;
249 openings in walls 101, 102 for discharge of turbines 97, 98;
251, 252 clutches connecting intermediate shafts 39a and 39b, respectively, to shafts 253 and 254, respectively;
253, 254 shafts joined with bevel gears 41 and 40, respectively;
300 output means, including parts 37, 38, 39a, 39b, 44, 46, 188a, 188b, 251 through 254, 303 and 307;
303 output differential, including components 40, 41, 42 and 43;
307 reversing differential, including components 69, 73, 74 and 76;
314 feed means for separately and selectively feeding liquid to the rotor drums 23 and 24 of flywheels A and B, respectively while each of the rotor drums rotates;
315 drain means for separately and selectively draining liquid from either of flywheels A and B, respectively while their rotor drums 23, 24 rotate.

Liquid in each rotor drum is separately, selectively and controllably varied by control means comprising feed means 314 and drain means 315, which respectively add liquid to and remove liquid from each flywheel while the rotor drums 23 and 24 are rotating about a common central axis represented by the center lines of intermediate shafts 39a and 39b, regardless of their rotational speeds.

The drain means 315 of FIG. 1 comprises a pair of separately actuatable scoops 95a and 95b which can be radially displaced in each drum 23 and 24, respectively, to direct liquid from the outer periphery of either drum 23, 24 into turbine wheels 97 and 98, respectively.

The feed means 314 consists of a pump 109 which can be driven from a gear 247 connected to drum 23 (FIG. 2). Valves 118a and 118b selectively control the flow of liquid into drums 23 and 24, respectively, through inlet chambers 113. The discharge falling from turbines 97 and 98 is directed by conical portions of inner walls 101, 102 through openings 249 in the inner walls and falls into a sump 248 at the bottom of the housing 2. Opening 249 in wall 102 is at the left of lines 3—3 in FIG. 2 and is therefore shown in phantom in FIG. 3. Pump 109 is preferably located in the sump 248. Inlet passages 94 (FIG. 2) in the drums 23 and 24 would actually function as pumps, but the separate pump 109 facilitates priming and control.

The input means consists of an input shaft 27 which can be connected by a clutch 29 to a gear 31 meshing with gear 81 in the reversing differential means 307.

The output means 300 includes intermediate shafts 39a and 39b within flywheels A and B, respectively. Each shaft 39a, 39b has three clutches. Clutches 188a and 188b on the respective shafts can connect the shafts to drums 23 and 24, respectively; clutches 37 and 38 to turbines 97 and 98, respectively; and clutches 251 and 252 to shafts 253 and 254, respectively. The latter two shafts are joined to bevel gears 41 and 40, respectively, in the output differential 303. Pinions 42 in differential 303 are mounted on a carrier 43 which is joined to the output shaft 44. A clutch 46 can lock shafts 44 and 254 together, thus locking differential 303 and producing a direct drive.

The clutch actuators 62 can be hydraulically operated in a conventional manner. Hydraulic pressure on a piston forces clutch engagement and a spring causes disengagement when the pressure is released, or vice versa. The pressure is transmitted from servovalves through tubing, through channels and circumferential grooves in bearing areas, through radial and axial holes in shafts, and/or through annular spaces formed between concentric shafts or a shaft and a stationary enclosure.

Turbine 97 is further geared to the reversing differential means by gears 87 and 81. Turbine 98 is connected by gears 88 and 82. Carrier 69 can be braked by brake band 201. When the carrier 69 is braked, the turbines are forced to rotate at equal speeds in opposite directions. The coupled turbines 97, 98 act as a single unit and can transmit energy to the output from both flywheels simultaneously. When drums 23 and 24 are both connected to turbines 97 and 98, respectively, through clutches 188a and 188b and the carrier 69 is braked, the drums 23 and 24 must also rotate at equal speeds in opposite directions.

Preferably, buckets 99 on each of the turbines 97, 98 are shaped like those in Terry type steam turbines, rather than the Pelton type, to facilitate discharge of the liquid. Discharge from a Terry bucket is from one side only and can be more easily drained away from the drums than with Pelton buckets, which discharge from both sides. (See FIGS. 2 and 3.)

The scoops 95a and 95b can be simply and accurately guided by links 96, selectively moved by separate actuators 202a and 202b, respectively. Individual control of each scoop 95a, 95b permits the greatest operational flexibility. Scoop 95a is on the side of the transmission that is not depicted in FIG. 2.

To extract energy, liquid 93 is removed from the outer periphery of at least one of the drums 23, 24 by scoop 95a or 95b and directed against the turbine 97 or 98, driving the turbine. The driven turbine is coupled through the appropriate clutches and brakes of output means 300 to output shaft 44. Liquid impacting and driving the turbine is captured in housing walls 101 or 102 and drained from the flywheel. Whether liquid 93 should be removed simultaneously or sequentially from each drum 23, 24 will depend on conditions. Drum speeds and turbine speed should be matched appropriately for maximum efficiency. Acceleration would be most rapid and the maximum amount of energy would be recoverable under the following conditions:

(1) Liquid is removed from both drums 23, 24 and directed against both turbines 97, 98 at least after one drum is filled in the lowest speed range and from the start of the higher speed ranges.

(2) The turbines 97, 98 are coupled by engaging brake band 201.

(3) In the lowest speed range, the clutch 188a, 188b in the drum 23, 24 which turns in the same direction as the output shaft 44 is disengaged. Clutches 188a and 188b are both disengaged in the higher (2 and 3) speed ranges.

TABLE 1 shows which clutches and brakes are engaged (designated by "E") to obtain various output speeds. The following letters represent the speed of the listed parts:
A: drum 23
B: drum 24
F: coupled flywheels
T: coupled turbines
A "−" sign denotes a "reverse" output speed.

TABLE 1

| Speed Range | Output Speed | Clutches | | | | | | | Brake Bands | | |
|---|---|---|---|---|---|---|---|---|---|---|---|
| | | 188a | 188b | 37 | 38 | 251 | 252 | 46/ | 200 | 201 | 60 |
| 1 | (A−B)/2 | E | E | E | E | E | E | | | | |
| | (T−B)/2 | | E | E | | E | E | | | E | |
| | (A−T)/2 | E | | | E | E | E | | | E | |
| 2 | A/2 | E | | E | | E | | | | E | E |
| | −A/2 | E | | E | E | | E | | E | E | |
| | B/2 | | E | E | E | E | | | | E | E |
| | −B/2 | | E | | E | | E | | E | E | |
| | F/2 | E | E | E | E | E | | | | E | E |
| | −F/2 | E | E | E | E | | E | | E | E | |
| | T/2 | | | E | | E | | | | E | E |
| | −T/2 | | | | E | | E | | E | E | |
| 3 | A | E | | E | | E | | E | | E | |
| | −A | E | | E | E | | E | E | | E | |
| | B | | E | E | E | E | | E | | E | |
| | −B | | E | | E | | E | E | | E | |
| | F | E | E | E | E | E | | E | | E | |
| | −F | E | E | E | E | | E | E | | E | |
| | T | | | E | | E | | E | | E | |
| | −T | | | | E | | E | E | | E | |

The (A−B)/2 output speed is the only one in which the output direction can be controlled entirely by adjusting the feed and drain means, whether the transmission is driving or braking.

Energy can be added to flywheel A from the input shaft 27 by engaging clutch 29 whenever clutches 37 and 188a are both engaged; to flywheel B, whenever clutches 38 and 188b are both engaged; and to both flywheels when all of these clutches are engaged. Energy from the output shaft can be stored in flywheel A when clutches 188a and 251 are engaged, in flywheel B when clutches 188b and 252 are engaged, and in both flywheels when all of these clutches are engaged. The clutch combinations for most of the output speeds in TABLE 1 are suitable for such energy storage. Energy is stored as a result of increasing the velocity of the clutched drum(s) 23, 24 and/or of increasing the drum inertia(s) by feeding liquid.

FIGS. 4 through 6 depict portions of a Pitot tube reaction assembly 203, which might replace either of the turbines 97, 98 of FIGS. 1 through 3 for higher operating efficiency. Each assembly 203 would be geared to its corresponding drum 23 or 24 at half-speed or less for removing liquid and extracting energy. Hydrodynamic friction between each assembly 203 and the faster moving liquid within the drums 23, 24 would be the major cause of energy loss with these devices. However, releasing brake band 204, depicted in FIG. 4, would allow the assemblies 203 to rotate freely and eliminate this loss when the assemblies 203 are not in use. The other depicted components include, in addition to an intermediate shaft 39′:

205 bevel gears attached to each rotor drum 23 and 24, meshing with pinions 207;

208 axles for pinions 207 attached to shaft projections 209 on the rotating Pitot tube assemblies 203;

210 liquid channels in Pitot tube assembly 203; and 211 streamline fairings at either end of the Pitot tube assembly 203.

Parts 204 through 208 replace clutches 188a and 188b in FIGS. 1-3. Fairing 211 minimizes hydrodynamic friction when assembly 203 is in use.

Bevel gears 205 and 206 and pinion(s) 207 on axle(s) 208 comprise a differential where the pinion carrier is the shaft projection 209 on the tube assembly 203. Engaging brake band 204 prevents rotation of the bevel gear 206. The tube assembly 203 then rotates at half the speed of gear 205, which is fastened to drum 23 or 24. The velocity head produced by the differing velocities of the liquids 93 in the drums 23, 24 and the tubes 210 exceeds the pressure head produced by rotation of the tubes in the assembly 203. Liquid 93 is consequently discharged through channels 210 and produces a torque on the tube assembly 203 and coupled drum 23 or 24. Multiple passages 210 are used to maintain proper operation as the liquid level drops and the passage entrances at the smaller radii of the assembly 203 become inactive. Transmission gearing for this configuration can be made similar to that to be discussed with respect to another embodiment of the invention depicted in FIGS. 12 through 19. Some gearing could be located within the flywheels 23, 24.

FIGS. 7 through 10 show a modified device, in which friction losses are minimized by inserting the ends of separate, modified Pitot tube assemblies 203′ into the liquid 93 the minimum distance required for operation and withdrawing the assemblies 203′ when inactive. The device includes, in addition to the modified Pitot tube assemblies 203′, the following other components shown in the various figures: bearings 213 and 214, arms 215 which retain the Pitot tube assemblies 203′, control arms 216, axial cam 217 controlling radial position of the Pitot tube assemblies 203′, thrust collar 218 actuating cam 217, shaft 219 projecting from arms 215, shaft 220 attached to arms 216, planing fairings 221 attached to the end of each Pitot tube assembly 203′, control links 222, pivot pins 223, counterweights 224 on the Pitot tube assemblies 203′ and gearing 225-228 connecting a rotor drum (23 or 24) with arms 215, bearings 229 in housing 2 for gears 226 and 227, and turning vanes 230 (FIG. 9) to reduce hydraulic head losses.

The assemblies 203′ produce relatively heavy loads on bearings 213 and 214 but the linkage arrangement and counterweights minimize these loads. The radius of the entrance to the Pitot tube channel 210′ is varied by rotation of arms 215 relative to arms 216. The solid and broken end-lines in FIG. 8 show relative positions when the assemblies 203′ are at maximum and minimum radii, respectively. One method of producing such rotation is to move cam 217 axially with the thrust collar 218, where the cam 217 is located between shafts 219 and 220 projecting from arms 215 and 216, respectively. Links 222 on pivot pins 223 keep the tube assemblies 203′ aligned. Counterbalances 224 on the tube assemblies 203′ align the centroids of the assemblies 203′ with the bearings 213 and 214. Thus the centroids remain at a constant radius and the work that would be required to change the radii of these rotating masses is eliminated. Preferably, the tube assemblies 203′ are permanently geared to the rotor drums (23 or 24) through gear 225 on the drum, gears 226 and 227 rotating on bearings 229 in the housing 2, and gear 228 on shaft 219.

Figure 11:
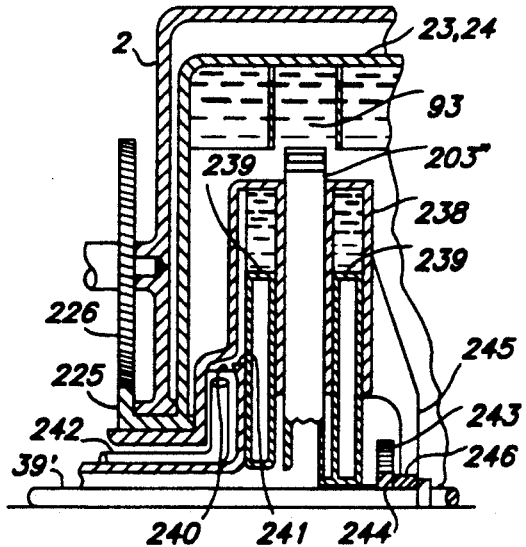
FIG. 11 is a partial longitudinal half-section of a Pitot tube reaction device similar to that in FIGS. 7 through 10 using hydraulic rather than mechanical balancing and operating means.

FIG. 11 shows a system for hydraulically balancing and operating a Pitot tube reaction assembly 203″ so that assembly 203″ can be moved radially into and out of the liquid 93 in the flywheel drum rotor 23 or 24. Tube assembly 203″ is surrounded by an annular float chamber 238 containing float 239 and is attached to the float 239 at its radially inward extremity. A leakproof fit of the float is not required because the buoyant force counteracts the centrifugal force. The radial position of the Pitot tube assembly 203″ is controlled by removing liquid from a liquid-level control chamber 240 through scoop 242 or admitting liquid through the scoop 242 or a separate suitable pipe (not depicted). An orifice 241 connecting chambers 238 and 240 restricts the liquid flow between the chamber 238 and 240 and prevents objectionably rapid motions of the tube assembly 203″. The modified embodiment is further preferably provided with a rack and pinion mechanism to assure that radially opposing assemblies 203″ move equal and opposite distances. Racks 243 are attached to the floats 239 of each assembly 203″ while the pinion 244 meshing with the racks is free to rotate on shaft 39′. Chambers 238 are supported at this location on bracket 245 attached to ring 246, the latter riding on intermediate shaft 39′ as well.

FIGS. 12-19 depict an alternate embodiment, continuously-variable energy storage transmission. Liquid filled flywheels A′ and B′ approximate the drum and spool mechanical flywheels of my prior invention, while eliminating the additional, variable inertia control flywheels required by that invention. The design of this embodiment is intended to have most of the advantages of liquid-filled flywheels recited above while overcoming the major disadvantages of reduced efficiency and reduced speed ranges. Energy can be transmitted between flywheels in the same manner as in the strip-winding control system in my original invention. This produces the same range of output speeds for a particular ratio of the maximum to minimum mass moments of inertia of the flywheels A′ and B′ and a particular set of gear ratios, as in the prior invention. What might be considered the major disadvantage of this embodiment is that the flywheels A' and B' are relatively mechanically complex and have relatively heavily loaded bearings.

Figure 12:
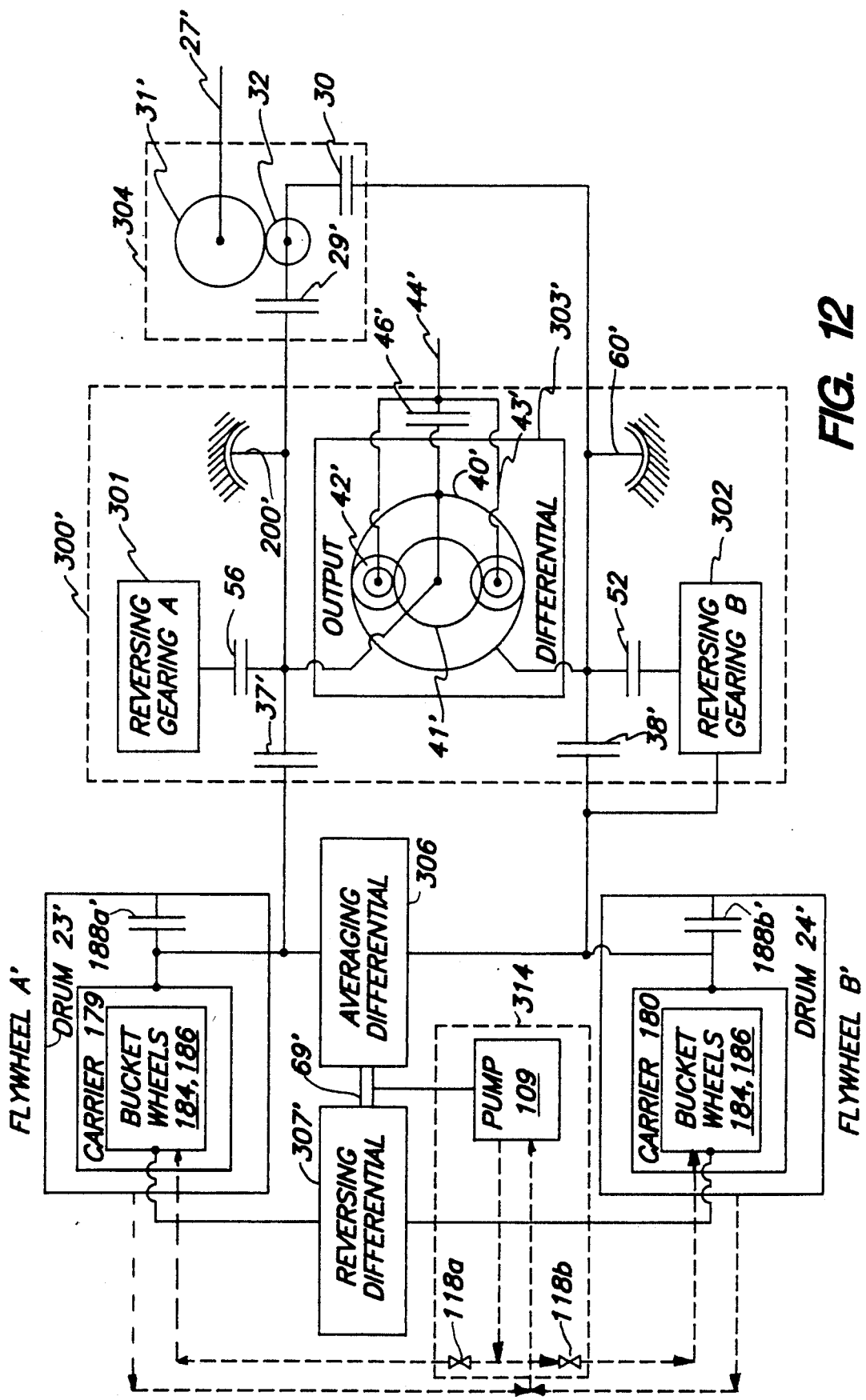
FIG. 12 is a block diagram showing a second, continuously variable transmission incorporating a pair of liquid weighted variable inertia flywheels which are generally equivalents of the mechanical flywheels of my prior invention.

FIG. 12 depicts in block diagram form the coupling between each of the flywheels A', B' and an input shaft 27' through input means, indicated generally at 304 and between the flywheels A', B' and an output shaft 44' through output means, indicated generally at 300'. Each flywheel A', B' comprises a rotor drum 23', 24' and a bucket wheel support carriers 179 or 180, respectively. Clutches 188a' and 188b' allow the support carriers 179 and 180 to be coupled with the rotor drums 23' and 24', respectively. The output means 300' is provided for selectively coupling the flywheels A', B' with the output shaft, 44', in either rotational direction of that shaft. The output means 300' preferably includes output differential means 303', reversing gearing means 301 associated with flywheel A' and, reversing gearing means 302 associated with flywheel B'. Reversing gearing 301, 302 provide "reverse" outputs from the flywheels A', B', respectively, to the output shaft 44' through the output differential 303'. Output differential 303' includes internal gear 40', sun gear 41' and planet gear assemblies 42' which are coupled with a planet carrier 43' mounted at the end of output shaft 44'. A clutch 46' is provided to lock carrier 43' to the internal gear 40' forcing all parts 40' through 43' of the output differential 303' to rotate as a single unit, thus producing a direct drive. The output means 300' further encompasses output clutch means comprising clutches 37' and 56, which couple the flywheel A' (actually support carrier 179 of flywheel A') to the sun gear 41' in "forward" and "reverse" directions, respectively, through intermediate shaft 39'', and clutches 38'' and 52 which couple support carrier 180 of flywheel B' in "forward" and "reverse" directions, respectively, directly to the internal gear 40'. The output means 300' further comprises brake band 200', which can be applied to the sun gear 41' through supporting intermediate shaft 39'', and brake band 60', which can be applied directly to the exterior of internal gear 40'. Reversing gearing 301 comprises gears 54, 57 and 59 while reversing gearing 302 comprises gears 47, 48 and 51, respectively. Pump 109 is driven from a pinion carrier 69' coupling averaging and reversing differentials 306 and 307', respectively, the purpose of which will be explained.

Input means 304 between input shaft 27' and each of the flywheels A' and B' comprises input gear 31 driving clutch wheel 32 supporting input clutch means comprising clutches 29' and 30.

Clutch 29' drives the intermediate shaft 39'' indirectly through gear 33 and planetary gear assemblies 42'. Carrier 43' is attached to the output shaft 44' between gears 33 and 41' and prevents a direct connection between 29' and 39''. However, the gear ratio from clutch 29' to shaft 39'' is 1:1 if gears 33 and 41' have the same diameter, regardless of the carrier and output shaft rotation. Clutch 30 drives internal gear 40' directly.

The input shaft 27' can only drive a flywheel A' or B' that is connected to the output differential 303'. Therefore the flywheel driven by the input shaft and the flywheel driving the output shaft must be the same. What is not possible in this embodiment is independently driving the remaining flywheel from the input shaft 27'. In order to absorb an appreciable amount of energy from either the input or the output shaft, clutch 188a' or 188b' in the subject flywheel must be engaged, thus causing drums 23' or 24', respectively, to be driven.

If clutches 29' and 30 are single acting and are both engaged, both flywheels A' and B' could be driven by the input shaft 27'. However, this would force both flywheels and the output shaft 44' to rotate at the same speed and the input would be directly geared to the output. This type of operation would be equivalent to an ordinary transmission with unusually high inertia.

Preferably, the flywheels A' and B, are positioned side by side for coaxial rotation. Preferably, the flywheel drums 23' and 24' and support carriers 179 and 180 are all rotationally coupled together through averaging differential means and reversing differential means 306 and 307', respectively (FIG. 12). Averaging differential means 306 comprises bevel gear teeth 71 and 72 connecting support carriers 179 and 180 together through bevel pinions 75 (see FIG. 13). Reversing differential means 307' comprises joined gears 189 and 73', meshing with gears 192 and pinion 76', respectively, and joined gears 190 and 74' meshing with gears 191 and pinion 76', again, respectively. Carrier 69', supporting pinions 75 and 76', constitute means for coupling the averaging differential means 306 and the reversing differential means 307' together. These differentials 306 and 307' assure that the support carriers 179 and 180 rotate in the same direction and with the same average speed as the average speed of the rotor drum 23' and 24' and that the difference in speed between support carrier 179 and rotor drum 23' is exactly the opposite of the speed difference between the support carrier 180 and rotor drum 24'.

Further detail of the flywheels A' and B' and of the feed means for selectively feeding liquid into each rotor drum 23', 24' while the drum rotates and of drain means for selectively removing liquid from either drum 23', 24' while the drum rotates, whereby the moment of inertia of each flywheel is selectively varied, are shown in the following FIGS. 13-19.

A primary cause of inefficiencies in turbines, like that disclosed with respect to the embodiment of FIGS. 1 through 3, and hydraulic pumps generally is turbulence from high-velocity flows in contact with solid surfaces. The disclosed apparatus of FIGS. 12 through 19 is designed for admitting and removing liquid from the flywheels A', B' in a manner to minimize this loss by minimizing relative velocities between the liquid 93 and the solid surfaces. The apparatus uses the bucket wheels 184 and 186, which operate in a manner somewhat similar to the planet wheels in the hydraulic fluid torque transmitter disclosed in U.S. Pat. No. 3,334,528, incorporated by reference herein. However, that device is capable only of transmitting energy from an input to an output shaft and will lose an appreciable amount of the energy when the match between the shaft speeds is unfavorable. It cannot store or retrieve any significant amount of energy as does the present apparatus.

Figure 13:
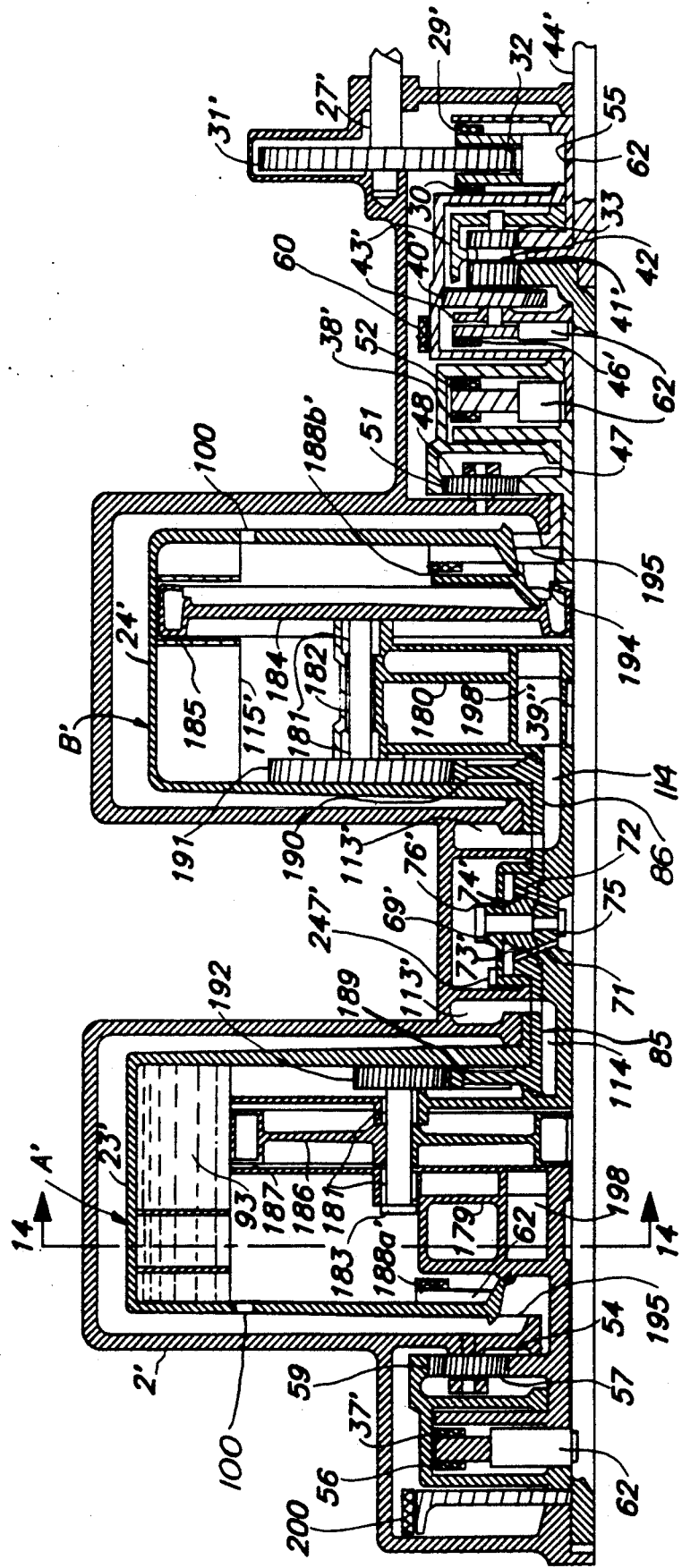
FIG. 13 is a longitudinal half-section of an embodiment of the transmission of FIG. 12 along the lines 13—13 in FIG. 14.
Figure 14:
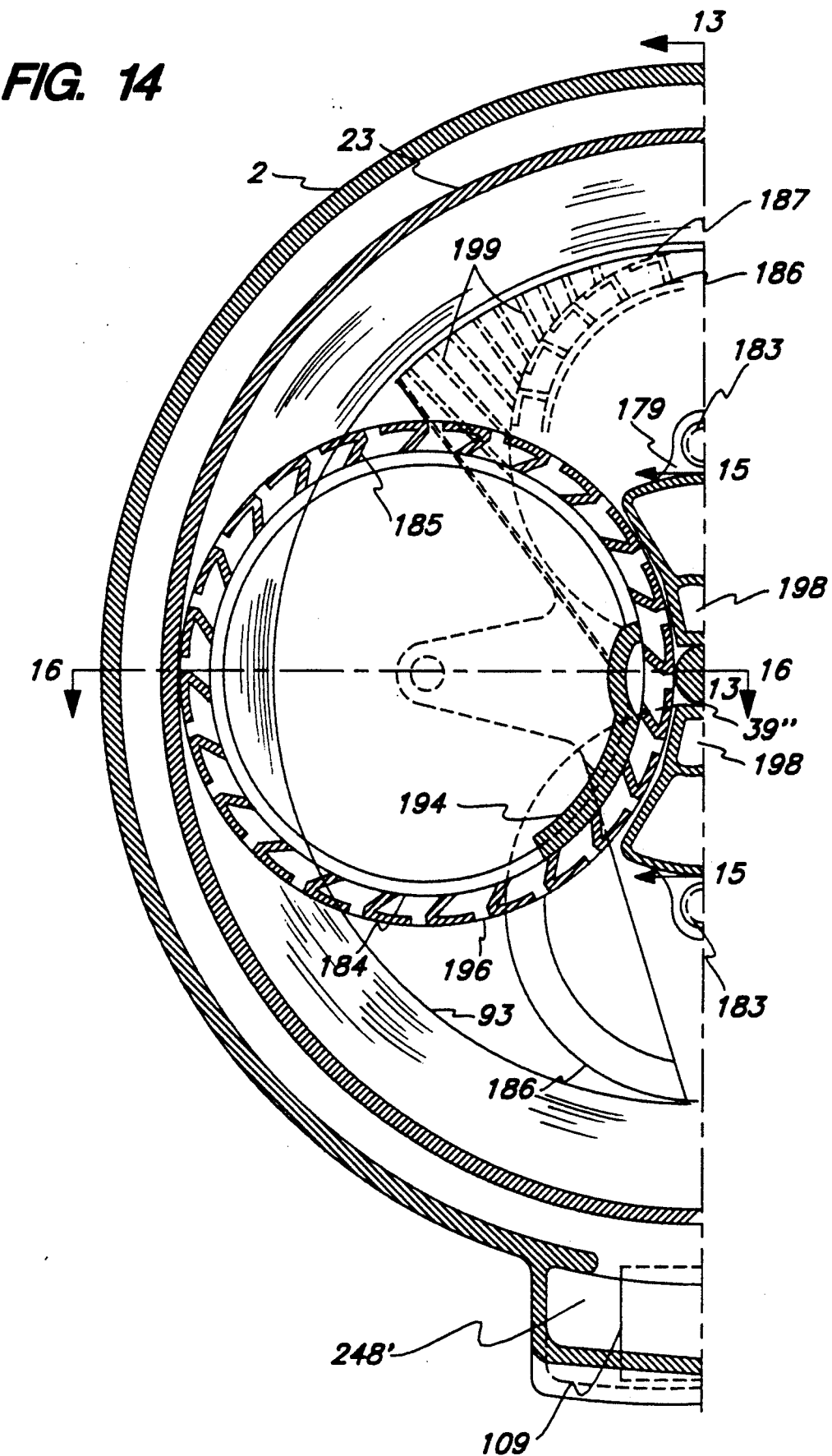
FIG. 14 is a transverse half-section along the lines 14—14 of FIG. 13.

Referring first to FIG. 13, each support carrier 179 and 180 supports bucket wheels 184 and 186 within the respective drum 23' and 24' of the respective flywheel A' and B' for rotating within that drum between an outermost circumferential wall of that drum and a central axis of the drum represented by the center line of intermediate shaft 39'' in each of the FIGS. 13 and 14. Each flywheel A', B' includes a pair of bucket pump wheels 184, diametrically mounted to each support carrier 179, 180 on opposing sides of those carriers by shafts 182, and a pair of bucket power wheels 186 diametrically mounted to each support carrier 179 and 180 on wheel shafts 183, between each of the power wheels 184. This arrangement is best seen in FIG. 14. Each of the pump wheels 184 extends from a position adjoining intermediate shaft 39", as close to that shaft as is possible, to the radially outermost part of the inner circumferential wall portion of the rotor drum 23' or 24'. Each power wheel 186 also extends from a position adjoining intermediate shaft 39" (again as close as possible) outwardly to a position located radially inwardly from the circumferential wall portion of either rotor drum 23', 24' and equal to the minimum (innermost) radial position of liquid 93 in the housings 23', 24'. Paddles 115' extend radially inwardly from the inner circumferential wall portion of each rotor drum 23' and 24' to the radial outermost position of the power wheels 186. A gap is provided in each paddle 115' for the outermost ends of the pump wheels 184.

In addition to mounting pairs of pump wheels 184 and power wheels 186, respectively, for rotation, support carriers 179 and 180 are themselves mounted for rotation within each drum 23' and 24', respectively. The carriers 179 and 180 can either rotate independently from the drums 23' and 24', respectively, or can be clutched to those drums by clutches 188a' and 188b', respectively.

Each pump wheel 184 supports a plurality of the buckets 185, substantially uniformly spaced around its outer periphery. When the pump wheels 184 rotate counterclockwise in FIG. 14, relative to carrier 179, for example, their buckets 185 carry liquid 93 from the outer periphery of drum 23' close to the central axis of the flywheel (center line of shaft 39"). Each of the buckets 185 is provided with a hole 196 on one side to admit liquid while limiting the volume each bucket 185 can carry, thus avoiding spillage of the liquid until the bucket 185 is close to the center of the drum 23' (24'). Seal arcs 194 are provided on each of the carriers 179 and 180 adjoining each pump wheel 184 at a relatively radially inward position (see FIG. 14) to hold the liquid 93 in each of the buckets 185 until the distance between the buckets 185 and center of drum 23' (24') is at a minimum. The liquid 93 is then discharged from the buckets 185 radially outward with respect to the central axis of the flywheel and through the discharge ports 195 provided through each of the drums 23' and 24'. After discharge, the liquid 93 preferably is collected in a sump 248' in the lower portion of the housing 2' beneath the flywheels A' and B' for recirculation by pump 109 as with the first embodiment. An axially extending flange portion of the seal arc 194 facing the pump wheel 184 (FIG. 13) is concave upward in a plane perpendicular to that figure to conform to the curvature of that wheel while an opposing flange portion, facing away from that wheel 184, is concave downward in a plane perpendicular to the figure to conform to the curvature of an adjoining, sealing flange portion of the rotor drum 24' covering the discharge port 195 to minimize flow loss back into the flywheel B' during drainage. Drainage from the pump wheel 184 is out of the plane of FIG. 14.

Buckets 185 are shaped to prevent trapping of air when the buckets 185 enter the liquid 93 at the periphery of the drum 23' or 24'. Compression of air and subsequent release under the liquid surface would waste energy. Maintaining a vacuum in the housing 2' would mitigate this problem.

The deceleration of the liquid 93 as it is transferred in the pump wheels 184 from a relatively high velocity at the drum outer circumference to a relatively low velocity near the center of the drum produces a torque on the carriers 179 and 180 which is transmitted through those carriers and the output means 300' to the output shaft 44'.

Through the averaging and reversing differential means 306 and 307', respectively, a rotation of gear 189 relative to support carrier 179 in flywheel A' will cause an equal and opposite rotation of gear 190 relative to support carrier 180 in flywheel B', and vice versa. The bucket wheels 184 and 186 are connected by gears 191 and 192, respectively, to gear 189 in flywheel A' and to gear 190 in flywheel B'. Therefore the bucket wheels in one of the flywheels A' or B' rotate in opposite directions relative to the support carrier 179 or 180, respectively, as do the bucket wheels in the other flywheel. Liquid fed to the pump wheels 184 and power wheels 186 in one flywheel causes a rotation of the pump wheels 184 in the other flywheel, thus pumping liquid out of the latter flywheel. This mechanism transfers energy from the nondriving or reverse-driving flywheel to the output.

Feed means again includes pump 109 and valves 118a and 118b for selectively feeding liquid 93 to either flywheel A' or B' while the flywheel rotates. Pump 109 can be driven through gear teeth 247' on pinion carrier 69' and a suitable gear train. Fluid 93 enters each of the flywheels A' and B' by inlet chambers 113' which admit liquid through channels 114 to inlet chambers 198 in each of the carriers 179 and 180. Each flywheel A', B' includes a connected pair of substantially identical chambers 198, best seen in FIG. 14, on opposite sides of intermediate shaft 39". The chambers 198 direct liquid into the bucket 185 and 187 of the pump wheels 184 and power wheels 186, respectively, near the center of each flywheel A' and B'. This is shown in FIGS. 15 through 19 which are fragmentary views through support carrier 179 with intermediate shaft 39" omitted for clarity. FIGS. 15 and 16 are longitudinal views displaced by 90° around intermediate shaft 39" while FIGS. 17-19 are transverse views. Fluid entrances are indicated by circles with center dots while fluid exits are indicated by circles with center "X's". Fluid flow is indicated by arrows. The entering liquid 93 creates unbalanced loads in the buckets 185 and 187 causing the wheels 184 and 186 to rotate, for example, in a clockwise direction relative to carrier 179 in FIG. 14. Enough power can be developed to produce rotation even if the subject flywheel A' or B' is rotating more slowly than the pumping flywheel and even though the power wheels 186 have a smaller diameter and are located at a smaller radius than the pump wheels 184. The volume of liquid being admitted to one flywheel can exceed the volume being removed from the other. Preferably, the power wheels 186 are geared to rotate faster than the pump wheels 184 and the buckets 187 of the power wheels 186 can be designed to carry more liquid because air compression is not a problem. Chutes 199, indicated in phantom in FIG. 14, which are parts of support carriers 179 and 180, efficiently accelerate liquid being spilled from the buckets 187 of the power wheels 186 into the drums 23', 24'.

The increase in velocity of the liquid 93 from a relatively low circumferential velocity near the center of either drum 23', 24' to a relatively high velocity at the flywheel and drum outer periphery produces a retarding torque on the carrier 179, 180 of the liquid fed flywheel A' or B'. The clutch 188a' or 188b' in this flywheel would be engaged and the retarding torque would be transmitted to that flywheel drum 23' or 24'.

Disengaging the clutch 188a' or 188b' in the other flywheel A' or B' allows the carrier 179 or 180, respectively, to accelerate faster than the flywheel drum 23' or 24' because the accelerated mass is less than the combined mass. Fluid friction would then be the only accelerating torque on the drum 23' or 24'. Losses would be somewhat higher than if the carriers 179, 180 were connected to the drum 23', 24' in the flywheel A', B'.

Control of the output speed of this transmission in a particular speed range is very simple and is done by varying the amount of liquid 93 admitted to one flywheel A', B' or the other through valves 118a or 118b. Liquid is admitted to the non-driving or reverse driving flywheel to maintain or increase the "forward" output speed. Liquid is admitted to the driving flywheel to decrease output speed. Overflow ports 100 in each of the drums 23' and 24' limit liquid level (see FIG. 13).

For example, in a conventional "forward" driving situation with the B' flywheel coupled to the output shaft 44' through the output means 300', liquid 93 would be fed to the non-driving or reverse driving flywheel A'. The added liquid causes rotation of the power wheels 186 and pump wheels 184 of flywheel A' which, in turn, drive the pump wheels 184 of the driving flywheel B', causing the pump wheels 184 of the driving flywheel B' to remove liquid 93. The liquid decelerating in the pump wheels 184 of the driving flywheel B' imparts a torque passed through its carrier 180 and the coupled output means 300' to the output shaft 44'. The speed of the carrier 180 of the driving flywheel B' increases as fluid is removed from that flywheel B'.

During braking an opposite operation occurs. Liquid is added to the "driving" flywheel, for example B' which is clutched to the output shaft 44' through the output means 300', causing flywheel B' and its carrier 180 to slow down, thereby absorbing energy from the output shaft 44'. Through the coupling provided by the averaging differential and reversing differential means 306 and 307', the carrier 179 of the "non-driving" flywheel A' would be accelerated. The carriers 179 and 180 should both be clutched to their respective rotor drums 23' and 24' during braking for maximum energy absorption.

TABLE 2 shows which clutches and brakes are engaged (designated by "E") to obtain various gear ratios between the bucket wheel carriers 179 or 180 or flywheel drums 23' or 24' and the output shaft 44'. It is assumed that the output torque is split equally between internal gear 40' and sun gear 41' and that the reverse ratio from gear 54 to internal gear 59 or from gear 47 to internal gear 51 is −R. A and B represent the speeds of drums 23' and 24' and carriers 179 and 180 when the respective clutches 188a' and 188b' are engaged. If the clutch is disengaged, A or B is the speed of the respective carrier 179 or 180. The clutch in the driving drum would be disengaged for maximum acceleration while the clutch in the nondriving drum would usually be engaged.

TABLE 2

| Speed Range | Output Speed | Clutches | | | | | Brake Bands | |
|---|---|---|---|---|---|---|---|---|
| | | 37' | 38' | 56 | 52 | 46'/ | 200' | 60' |
| 1 | (A−RB)/2 | E | | | E | | | |
| | (B−RA)/2 | | E | E | | | | |
| 2 | A/2 | E | | | | | | E |
| | B/2 | | E | | | | E | |
| 3 | A | E | | | E | | | |
| | B | | E | | | E | | |

TABLE 2-continued

| Speed Range | Output Speed | Clutches | | | | | Brake Bands | |
|---|---|---|---|---|---|---|---|---|
| | | 37' | 38' | 56 | 52 | 46'/ | 200' | 60' |
| R1 | (A+B)/2 | E | E | | | | | |
| | −RA/2 | | | E | | | | E |
| | −RB/2 | | | | E | | E | |
| R2 | −RA | | | E | | E | | |
| | −RB | | | | E | E | | |
| | −R(A+B)/2 | | | E | E | | | |

The (A+B)/2 and −R(A+B)/2 output speeds are averages of the outputs from the two flywheels. Speed control with the bucket wheels is less precise than with the other operating modes because a rise in speed of one flywheel would be offset by the drop in the speed of the other flywheel. Therefore these modes would probably not be very useful.

All gears, clutches, and shafts are located on the central axis in this transmission except for the input shaft 27' and an input gear 31'. This arrangement eliminates idler gears necessary in my original, mechanical invention. A prime mover can be coupled to input shaft 27' and input energy to whichever flywheel A' or B' is also coupled with the output shaft 44' through output differential 303'. However, it generally should not be necessary to impart energy to a flywheel declutched from the output differential 303' since there is no significant external torque to decrease the angular momentum of the declutched flywheel.

Figures 21, 22:
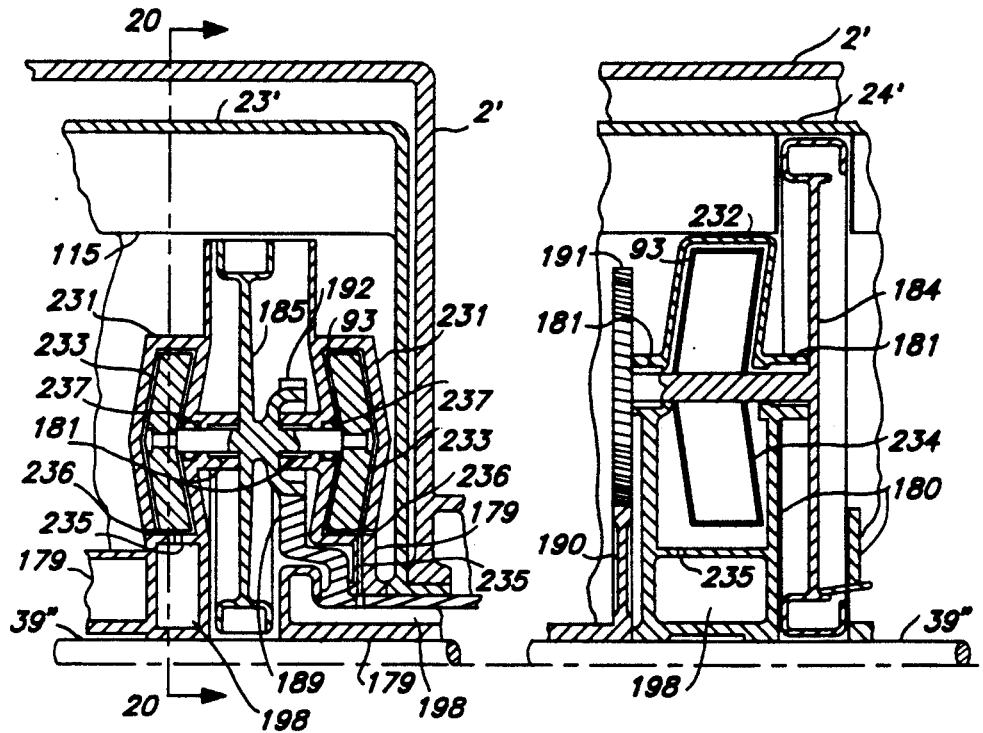
FIGS. 21 and 22 are broken half sections along the lines 21—21 and 22—22, respectively of FIG. 20 depicting hydraulic mounting means for relieving the heavy bearing loads generated by the bucket wheel shown in FIGS. 13 through 19.
Figure 20:
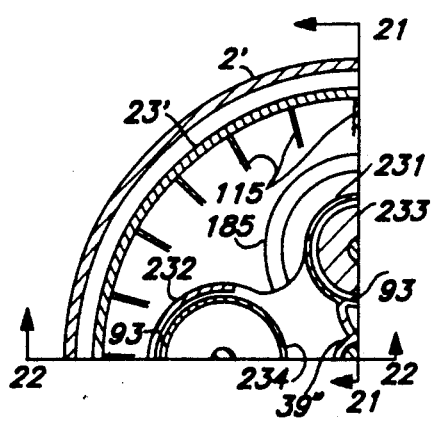
FIG. 20 is a transverse quarter-section view along the lines 20—20 of FIG. 21 through the housing, flywheel drum, flotation disks and chambers shown in FIGS. 21 and 22.

Roller bearings 181 are depicted in the embodiment of FIGS. 13 through 14 for supporting the shafts 182 and 183 on which the bucket wheels 184 and 186, respectively, turn. These bearings are relatively heavily loaded and may limit the overall capacity of the depicted transmission. FIGS. 20 through 22 depict flotation disks 233 and 234 which are provided for reducing the loads on the roller bearings 181 in the design of FIGS. 13 and 14.

The centrifugal loads of bucket wheels 184 and 186 and attached parts are counteracted by buoyant force of the liquid 93 in flotation disk chambers 231 and 232 on the flotation disks 233 and 234. The pressure gradient in the liquid 93 increases with rotational speed as fast as the centrifugal load of the solid parts. Therefore, an assembly that would float at a prescribed level in stationary tubs of the liquid 93 will continue to float in a rotating flywheel.

The flotation disks can be made of a solid material like disk 233 with a density substantially less than that of the liquid, a compressive strength sufficient for the pressure, and adequate tensile strength. The material must be either encapsulated or impermeable to the liquid.

The flotation disks could be made hollow like disk 234 if the strength is adequate for the pressure and if sufficiently light. The conical shape of both disks 233, 234 improve the strength. This feature may be even more important in minimizing the weight of the disk flotation chambers 231 and 232.

The maximum buoyant force would be obtained by surrounding the disks with liquid 93 as is done with chambers 231 with disks 233. However, this requires shaft seals 237. Orifices 235 replenish the liquid 93 in the chambers 231, 232 whenever liquid is admitted to flywheels through channels 198. Overflow ports 236 in closed chambers 231 prevent unnecessarily high pressures in those chambers. Semicircular flotation chambers (part 232, FIGS. 20 and 22) do not require shaft seals, but provide a lower buoyant force.

The hydrodynamic loss caused by rotation of the flotation disks 233 or 234 should not be excessive if relative speeds are low. Hydrostatic bearings are a possibility which might reduce this loss, but these would also have to be large if the lubricant pressure is produced exclusively by the flywheel rotation. In addition, the flotation disks 233, 234 do not require the high precision or have the pumping losses associated with hydrostatic bearings.

I claim:

1. A variable inertia flywheel comprising:
 a liquid retaining rotor drum mounted for rotation about a central axis; and
 liquid control means for controllably varying an amount of liquid in the rotor drum during rotation of the rotor drum, the liquid control means including feed means for selectively feeding liquid into the rotor drum while the rotor drum rotates and drain means for selectively removing liquid from the rotor drum while the rotor drum rotates, whereby the moment of inertia of the flywheel is selectively and controllably variable regardless of rotational speed of the rotor drum;
 at least one of the drain means and the feed means comprising bucket wheel means rotating within the rotor drum between an outer circumferential wall of the rotor drum and the central axis.

2. The flywheel of claim 1 wherein each of the drain means and the feed means comprises separate bucket wheel means rotating within the rotor drum between the outer circumferential wall of the rotor drum and the central axis.

3. A variable inertia flywheel comprising:
 a liquid retaining rotor drum mounted for rotation about a central axis, liquid retained in the rotor drum forming a ring in the rotor drum when the rotor drum and the retained liquid are rotated; and
 liquid control means for controllably varying an amount of liquid in the rotor drum during rotation of the rotor drum, the liquid control means including feed means for selectively feeding liquid into the rotor drum while the rotor drum rotates and drain means for selectively removing liquid from the rotor drum while the rotor drum rotates, whereby the moment of inertia of the flywheel is selectively and controllably variable regardless of rotational speed of the rotor drum, the drain means including liquid removing means for directing liquid radially inwardly from the liquid ring and arm means extending at least generally radially outwardly in the rotor drum for supporting the liquid removing means in the liquid ring.

4. The flywheel of claim 3 wherein the liquid removing means comprises a Pitot tube rotating within the flywheel.

5. The flywheel of claim 3 wherein the liquid removing means comprises scoop means for deflecting liquid radially inwardly from the ring.

6. The flywheel of claim 5 in further combination with impulse turbine means coaxially mounted within the rotor drum and positioned to be struck and rotated by liquid deflected from the ring by the scoop means.

7. The flywheel of claim 3 wherein the arm means is movable in at least a generally radial direction within the rotor drum.

8. The flywheel of claim 3 wherein the arm means is mounted for rotation about the central axis and further comprising reduction means for coupling the arm means with the rotor drum for rotation of the arm means at a speed less than rotor drum speed and clutch means for decoupling the arm means and the rotor drum.

9. An energy storage apparatus comprising:
 a pair of variable inertia flywheels, each flywheel including a liquid retaining rotor drum, the rotor drums being mounted for side-by-side rotation;
 control means for controllably and separately varying amounts of liquid in each rotor drum during rotation of the rotor drums, whereby the moment of inertia of each of the pair of flywheels is selectively varied while the rotor drum of each flywheel rotates;
 an output shaft; and
 output means for selectively coupling the output shaft with either one of the two flywheels.

10. The apparatus of claim 9 wherein the output means couples the output shaft with a rotating portion of the drain means of the selected flywheel.

11. The apparatus of claim 10 wherein the output means permits coupling of the rotor drum with the rotating portion of the drain means and the driving of the rotor drum with the output shaft through the drain means.

12. The apparatus of claim 1 further comprising:
 an input shaft; and
 an input means for selectively coupling the input shaft with either one of the two flywheels.

13. The apparatus of claim 9 wherein the output means comprises output differential means for selectively coupling the output shaft simultaneously with both flywheels.

14. The apparatus of claim 9 wherein the output comprises reverse gearing means for selectively coupling either flywheel with the output shaft in either of two opposite rotational directions.

15. The apparatus of claim 13 wherein the drain means of each flywheel comprises a turbine and further comprising coupling means for coupling the turbines of the two flywheels together for simultaneous rotation at the same speed.

16. The apparatus of claim 9 further comprising coupling means coupling at least portions of the two flywheels together for energy transfer directly between flywheels.

17. A variable inertia flywheel comprising:
 a liquid retaining rotor drum mounted for rotation about a central axis;
 liquid control means for controllably varying an amount of liquid in the rotor drum during rotation of the rotor drum, the liquid control means including feed means for selectively feeding liquid into the rotor drum while the rotor drum rotates and drain means for selectively removing liquid from the rotor drum while the rotor drum rotates, whereby the moment of inertia of the flywheel is selectively and controllably variable regardless of rotational speed of the rotor drum; and
 flotation means for supporting a rotating portion of the liquid control means on a liquid bearing.

* * * * *